(12) United States Patent
Kareti

(10) Patent No.: US 10,178,110 B2
(45) Date of Patent: Jan. 8, 2019

(54) DETECTION OF SLEEP DEPRIVATION ATTACK AND MITIGATION

(71) Applicant: Broadcom Corporation, Irvine, CA (US)

(72) Inventor: Sreenadh Kareti, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 183 days.

(21) Appl. No.: 15/164,792

(22) Filed: May 25, 2016

(65) Prior Publication Data

US 2017/0318039 A1 Nov. 2, 2017

Related U.S. Application Data

(60) Provisional application No. 62/329,085, filed on Apr. 28, 2016.

(51) Int. Cl.

| | | |
|---|---|---|
| *G06F 21/55* | (2013.01) | |
| *G06F 1/32* | (2006.01) | |
| *H04L 29/06* | (2006.01) | |
| *G06F 1/28* | (2006.01) | |
| *H04W 12/12* | (2009.01) | |

(Continued)

(52) U.S. Cl.
CPC ............ *H04L 63/1416* (2013.01); *G06F 1/28* (2013.01); *G06F 1/3206* (2013.01); *G06F 1/3209* (2013.01); *G06F 1/3212* (2013.01); *G06F 21/00* (2013.01); *G06F 21/554* (2013.01); *H04W 12/12* (2013.01); *H04W 52/0216* (2013.01); *H04W 52/0229* (2013.01); *H04W 52/0235* (2013.01); *H04W 84/18* (2013.01)

(58) Field of Classification Search
CPC .............................. G06F 1/3206; G06F 21/55
USPC .................. 713/300, 320, 323, 340
See application file for complete search history.

(56) References Cited

U.S. PATENT DOCUMENTS

| | | | |
|---|---|---|---|
| 8,527,794 B2 | 9/2013 | Ibrahim et al. | |
| 2011/0153855 A1* | 6/2011 | Kim | .................... H04L 63/1441 709/229 |
| 2015/0161389 A1* | 6/2015 | Gregg | .................. G06F 21/554 726/22 |

OTHER PUBLICATIONS

"Battery Size Matters: Five funamental considerations for a battery-powered, wireles IoT sensor product," Silicon Labs, 2016, retrieved from https://www.silabs.com/iot/Pages/battery-life-in-connected-wireless-iot-devices.aspx.

(Continued)

*Primary Examiner* — Izunna Okeke
(74) *Attorney, Agent, or Firm* — Morgan Lewis & Bockius LLP

(57) ABSTRACT

Systems and methods are provided for detecting and mitigating a sleep deprivation attack (SDA). A method for detection of the SDA includes one of tracking power consumption rate of a device, incoming request signals received by the device, or an activity duration of one or more physical interfaces of the device. A system for mitigation of the SDA includes the device to be protected from the SDA, a counter to count request signals received by the device from another device, a counter attack circuit to pose one or more security challenges by sending a request message to the other device once a counted number of request signals exceeds a pre-determined number, and a control circuit to terminate connection with the other device if an expected reply based on the request message is not received from the other device within a pre-determined time duration.

20 Claims, 15 Drawing Sheets

(51) Int. Cl.
   *G06F 21/00* (2013.01)
   *H04W 52/02* (2009.01)
   *H04W 84/18* (2009.01)

(56) References Cited

OTHER PUBLICATIONS

Dementyev, et al., "Power Consumption Analysis of Bluetooth Low Engergy, Zigbee and ANT Sensor Nodes in a Cyclic Sleep Scenario," Microsoft Research and National Science Foundation 2013, retrieved from http://research.microsoft.com/pubs/192688/IWS%202013%20wireless%20power%20consumption.pdf.

Baviskar et. al., "Comparative Study of Communication Technologies for Power Optimized Automation Systems: A Review and Implementation," 2015 Fifth International Conference on Communication Systems and Network Technologies, Apr. 2015.

Barcena, et al., "Insecurity in the Internet of Things," white paper published Mar. 2015; retrieved from http://www.slideshare.net/symantec/white-paper-insecurity-in-the-internet-of-things.

"Internet of Things: Wiresless Sensor Networks," white paper published by International Electrotechnical Commission, 2014; retrieved from http://www.iec.ch/whitepaper/pdf/iecWP-internetofthings-LR-en.pdf.

Bhattasali et al., "Sleep Deprivation Attack Detection in Wireless Sensor Network," International Journal of Computer Applications, vol. 40—No. 15, Feb. 2012.

Martin, et al., "Denial-of-Service Attacks on Battery-powered Mobile Computers," 2004 Proceedings of the Second IEEE Annual Conference on Pervasive Computing and Communications (PERCOM'04).

* cited by examiner

600

| TIME | TEMPERATURE | PREVIOUS REQUEST TIME | REQUEST COMING ON THE INTERFACE | POWER CONSUMPTION DURING LAST 15 MINS | PERIPHERALS USED IN LAST 15 MINS | INPUT-REQUEST CLASSIFICATION USING CLASSIFICATION ALGORITHM |
|---|---|---|---|---|---|---|
| 10:00, 10TH FEB 2016 | 23C | 8:00, 10TH FEB 2016 | WI-FI | 2500mWATT-HOUR | CAMERA FLASH, WIFI | BENIGN |
| 14:00, 10TH FEB 2016 | 29C | 10:00, 10TH FEB 2016 | WI-FI | 2500mWATT-HOUR | CAMERA FLASH, WIFI | BENIGN |
| 18:00, 10TH FEB 2016 | 21C | 14:00, 10TH FEB 2016 | WI-FI | 2400mWATT-HOUR | CAMERA FLASH, WIFI | BENIGN |
| 22:00, 10TH FEB 2016 | 17C | 18:00, 10TH FEB 2016 | WI-FI | 2400mWATT-HOUR | CAMERA FLASH, WIFI | BENIGN |
| 22:01, 10TH FEB 2016 | 17C | 22:00, 10TH FEB 2016 | BLE | 2500mWATT-HOUR | CAMERA FLASH, WIFI | BENIGN |
| 22:02, 10TH FEB 2016 | 17C | 22:01, 10TH FEB 2016 | BLE | 2600mWATT-HOUR | CAMERA FLASH, WIFI | MALIGNANT |
| 22:03, 10TH FEB 2016 | 17C | 22:02, 10TH FEB 2016 | BLE | 2800mWATT-HOUR | CAMERA FLASH, WIFI | MALIGNANT |

FIG.6

DETECTION OF SLEEP DEPRIVATION ATTACK AND MITIGATION

This application claims the benefit of priority under 35 U.S.C. § 119 from U.S. Provisional Patent Application 62/329,085 filed Apr. 28, 2016, which is incorporated herein by reference in its entirety.

TECHNICAL FIELD

The present description relates generally to device security, and more particularly, to detection of sleep deprivation attack and mitigation.

BACKGROUND

Integrated circuit devices are penetrating into diverse application areas ranging from smart homes to military surveillance. There are many devices (e.g., pacemakers, smart door locks, sensors, etc.) built to be battery powered only and are expected to work for long time durations ranging from 5 to 10 years. A battery powered device (BPD) can, for instance, be a node of an Internet of things (JOT) network that is in connection with other nodes or stations via Wi-Fi or low-energy Bluetooth (BLE). Various security attacks are targeted on embedded system-based devices to manipulate functionality or to make them non-functional. One of the attacks could be by draining the battery of these systems faster and eventually triggering Denial of Service (DoS) attack. These attacks could be life threatening and can have severe financial impact if performed on devices belonging, for example, to health, military surveillance, factory automation, and home automation.

An attacking source can be a compromised node in the network, a remote computer over the Internet, or a computing device (e.g., a computer, a mobile phone, etc.) directly using its physical interface. The attack source can use, for example, one or more wireless interfaces of a targeted node. The attack can be a sleep deprivation attack (SDA), in which the attacker, for example, keeps the targeted device in an active state for a longer duration by sending legitimate request signals repeatedly to drain its battery.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates an example system context table of a remotely deployed surveillance device according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, methods and configurations are described for detecting and mitigating sleep deprivation attacks (SDAs). The techniques of the subject technology allow protection of operational life time of a subject battery powered device (BPD), by detecting and mitigating SDA. The subject technology further improves the reliability of the BPD and a corresponding network such as an Internet of things (IOT) network by providing additional security features.

Figure 1:
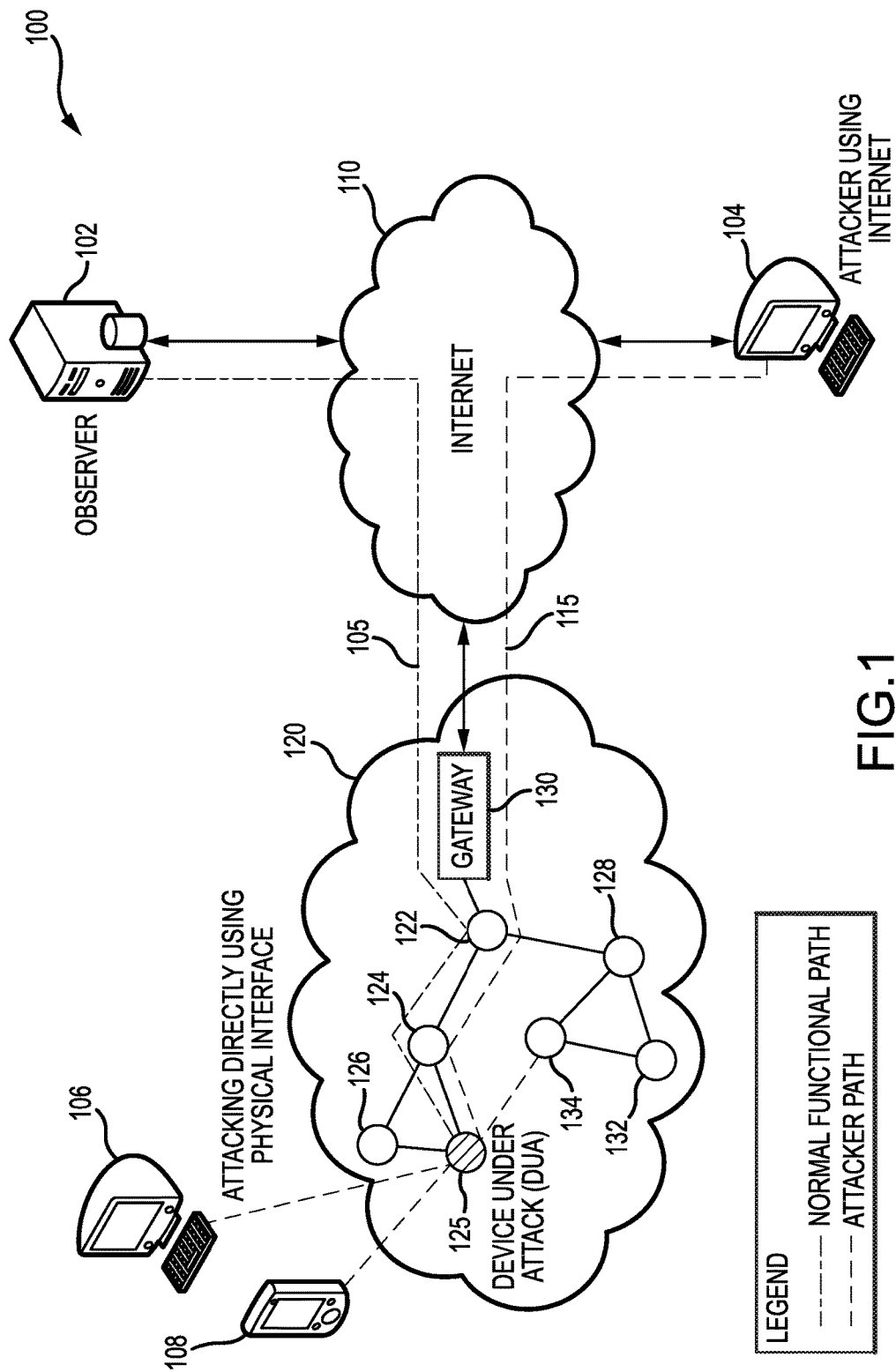
FIG. 1 illustrates an example of an environment for sleep deprivation attack (SDA) detection and mitigation.

FIG. 1 illustrates an example of an environment 100 for sleep deprivation attack (SDA) detection and mitigation. The environment 100 includes a first network (e.g., the Internet) 110, a second network (e.g., an IOT network, such as a sensor network) 120, a server 102, a remote computing system 104, a computing system 106, a communication device 108. The second network 120 includes a gateway 130 and a number of devices such as sensor devices (e.g., environmental sensors) 122, 124, 125, 126, 128, 132, and 134. In one or more aspects, the gateway 130 couples the first network 120 to the Internet 110. The sever 102 can be an observer and play, for example, a supervisory role of for the second network 120. The server 102 can communicate with a number of devices (e.g., 122, 124, and 125) via the Internet network 110 and the gateway 130 through a normal functional path 105. The devices of the second network can be inter-connected via one or more communication protocols (e.g., Wi-Fi, Bluetooth, near field communication (NFC), actor-network theory (ANT), Powerline, IPv6 over Low power wireless personal area networks (6Low PAN), and/or ZigBee).

In one or more aspects, a device 125 (e.g., device under attack (DUA)) of the IOT network 110 is under attack (e.g., SDA) from an attacker such as the remote computing system 104 via an attacker path 115 through the Internet 110 and the gateway 130. In some aspects, the attacker is the computing device 106 (e.g., via a physical interface such as Bluetooth or other wireless interfaces) and/or the communication device 108 (e.g., via a physical interface such as Bluetooth, NFC, or other wireless interfaces). The attack can also come from a compromised node of the IOT network 120, for example, from the device 134. In some aspects, the attacker can perform DoS (Denial of Service) attack by keeping the device in an active state for a longer than normal duration by sending request signals (e.g., legitimate-sounding request signals) repeatedly. The DUA can keep processing the incoming request signals from the attacker(s) and respond as they seem to be legitimate request signals. The SDA can be triggered in a number of ways, for example, preventing the DUA from going into sleep state by repeatedly requesting more and more data from the targeted attack device, or reducing the sleep interval time of the device by changing the wake up configuration settings of the device as described in more detail herein.

The SDA can jeopardize security, environment, and/or people's health among other issues. For instance, the sensor devices of the IOT network 120 of FIG. 1 can be deployed in a field to monitor status of oil and gas transmission. An attacker can perform SDA to kill the devices deployed in the field and disrupt the transmission line after killing monitoring devices, which can lead to late detection and financial loss. In some aspects, a DUA is a BPD remotely deployed to monitor enemy movements in a battle field. In one or more aspects, the DUA becomes non-functional after an SDA, thus enabling enemy to break in. As another example, a health monitoring or control device such as a wearable patient monitoring BPD or a pacemaker device installed in patient's body can be attacked. The attack can occur over a wireless interface of the device when the patient is in a public place such as a gym, restaurant, a movie theatre, an office, a shopping mall, or another public place, without patient's knowledge. The attack would drain the battery leaving patient's life at risk. In another example, draining the battery of a digital door lock of a home or office allows intruders to break in.

Figure 2:
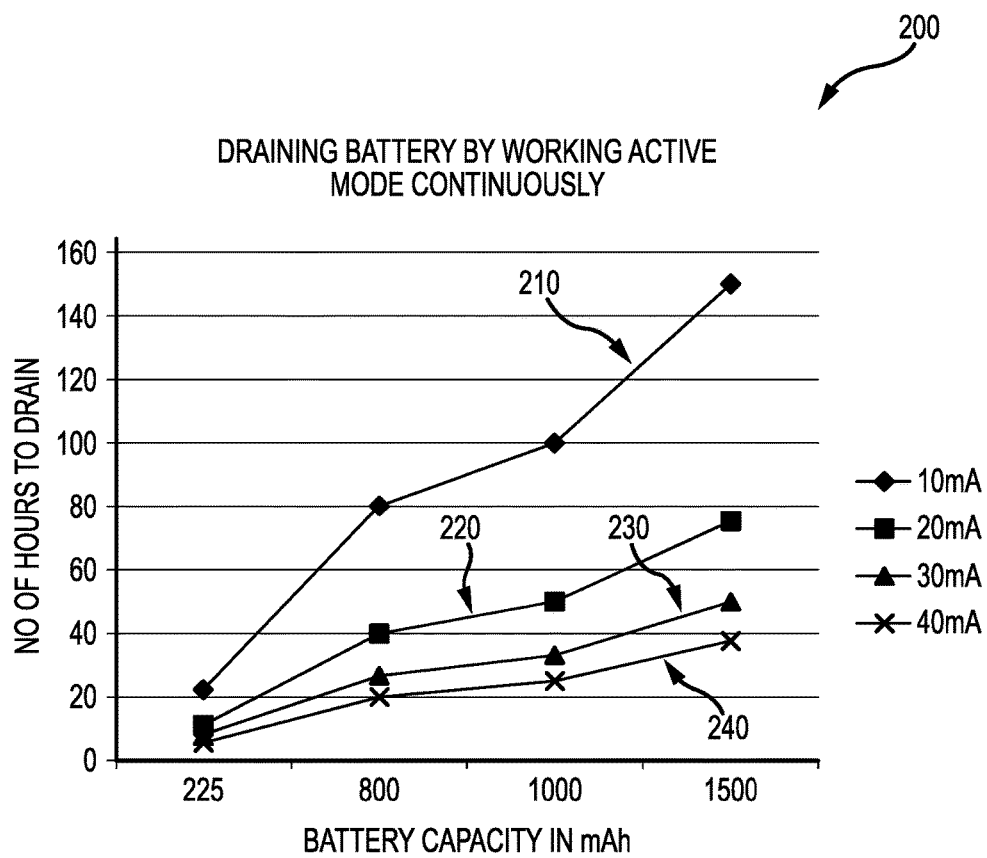
FIG. 2 illustrates an example diagram showing battery drainage of a device under SDA.

FIG. 2 illustrates an example diagram 200 showing battery drainage of a device under SDA. A device under attack can be kept operating by the attacker to drain out its battery. In the diagram 200, plots 210, 220, 230, and 240 show the time (number of hours) it takes to drain a battery of a typical DUA as a function of its battery capacity (in milli-Ampere-hr (mAh)) for various operating currents (e.g., 10 mA, 20 mA, 30 mA, or 40 mA). For example, a 225 mAh battery of a DUA (e.g., 125 of FIG. 1) can be drained out in 5.625 hours by keeping the device operating at 40 mA.

Figure 3A:
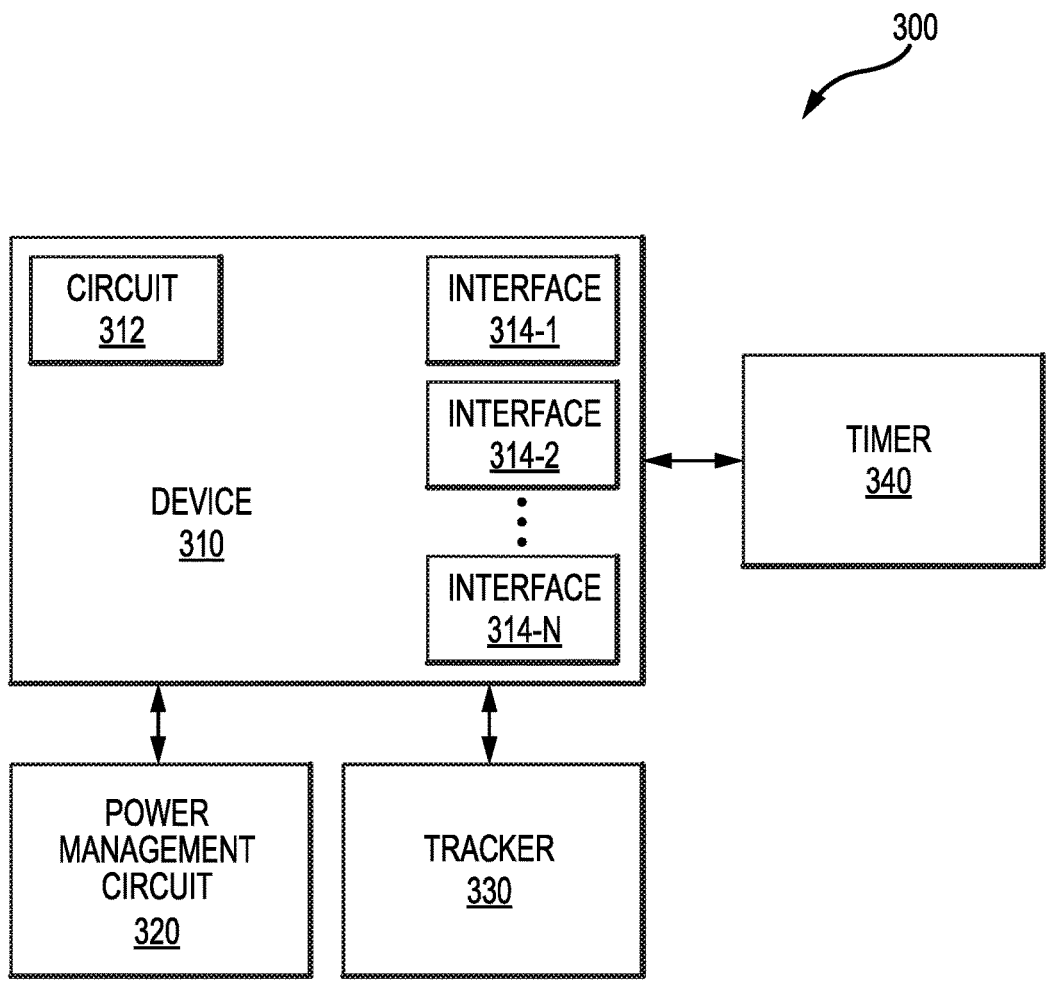
FIGS. 3A-3B illustrate an example of a system for SDA detection and a corresponding flow chart according to aspects of the subject technology.
Figure 3B:
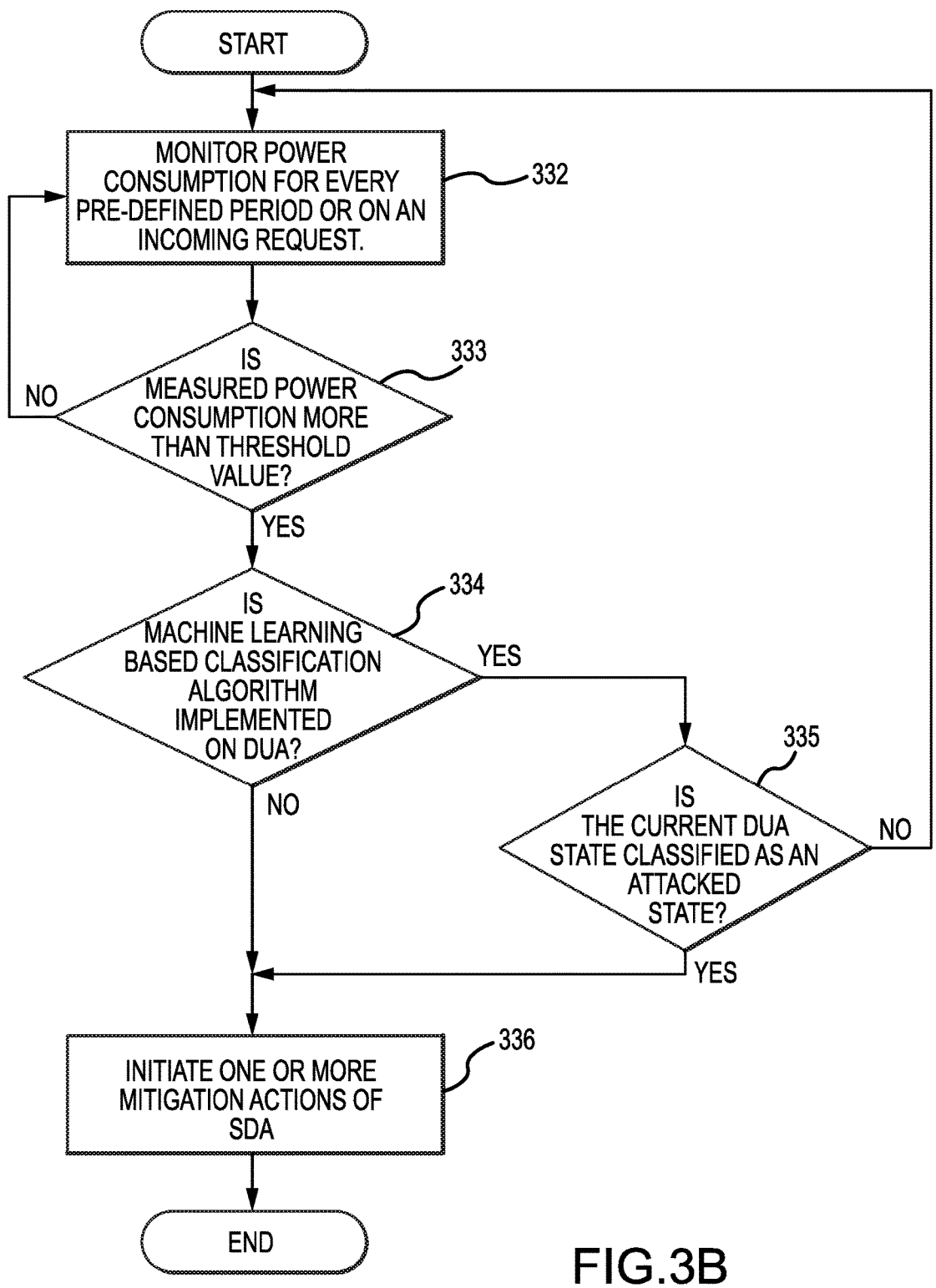

FIGS. 3A-3B illustrate an example of a system 300A for SDA detection and a corresponding flow chart 300B according to aspects of the subject technology. The system 300 includes a device 310 (e.g., a DUA), a power management circuit 320, a tracker circuit 330, and a timer 340. In one or more implementations, the device 310 includes one or more circuits such as circuit 312, which is responsible for perfuming the main functionalities of the device 310, and a number of physical interfaces 314 (e.g., 314-1 through 314-N, such as Wi-Fi, Bluetooth, NFC, ZigBee, or other interfaces). The SDA detection can be performed by tracking the rate of power consumption of the device 310, tracking incoming requests received by the device 310, or tracking the activity duration of one or more physical interfaces 314 of the device 310. In one or more aspects, the power management circuit 320 can track the rate of power consumption of the device 310 by, for example, monitoring a current drawn by the device 310 or the circuit 312 of the device, using one of an on-chip logic circuit or an on-board additional power management chip. The SDA can also be tracked by the tracker circuit 330, which tracks incoming request signals to the device 310. The tracker circuit 330 can utilize a machine learning based classification algorithm to detect the SDA based on timing or other operating conditions, for example, time of the day, temperature, ambient light, and/or other conditions. In some implementations, the timer 340 tracks the activity duration of one or more of the physical interfaces 314 of the device 310. If the activity duration is longer than a pre-determined time (e.g., 5 seconds) the device 310 can be considered under attack (e.g., SDA).

FIG. 3B shows an operational flow chart 300B of the tracker circuit 330. At operation block 332, power consumption of the device 310 is monitored using an on-chip and/or an on-board power management circuit (e.g., 320). The monitoring is performed for a pre-defined period (e.g., 15 minutes) or based on an incoming request. At control block 333, it is checked whether the measured power consumption is more than a threshold value. If the measured power consumption is not more than the threshold value the control is passed to operation block 332. Otherwise, if the measured power consumption is more than the threshold value, at control block 334 it is determined whether a machine learning based classification algorithm is implemented on the DUA. If the answer is no, the control is passed to an operation block 336. Otherwise, if the answer is yes, at control block 335 determination is made that whether the machine learning based classification algorithm classified the current DUA state as an attacked state. If the answer is no, control is passed to operation block 332, otherwise, if the answer is yes, the control is passed to operation block 336. At operation block 336, one or more mitigation action of the SDA are initiated as explained in more detail herein.

Figure 4A:
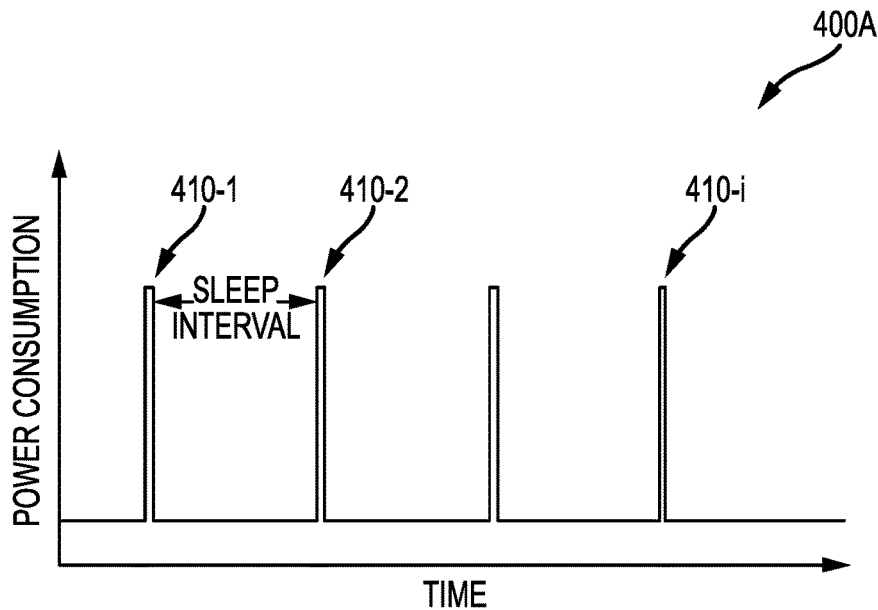
FIGS. 4A-4B illustrate examples of power consumption of a battery-powered device (BPD) under normal and SDA conditions according to aspects of the subject technology.
Figure 4B:
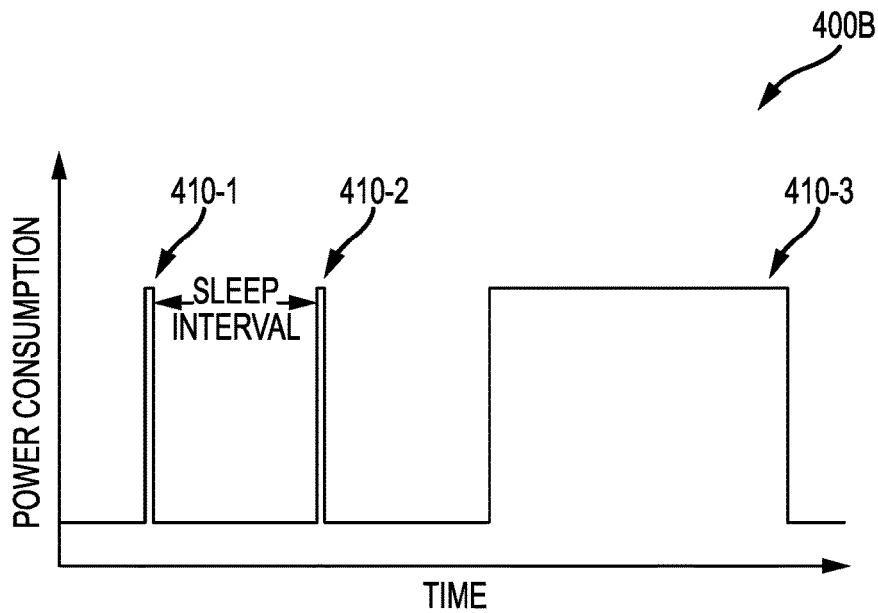

FIGS. 4A-4B illustrate examples of power consumption of a battery-powered device (BPD) under normal conditions (400A) and SDA condition (400B) according to aspects of the subject technology. Under normal conditions, the power consumption of the device 310 (or the circuit 312) of FIG. 3, as monitored by the power management circuit 320 of FIG. 3, rise during activity periods 410 (e.g., 410-1, 410-2 . . . 410-$i$) and drop during sleep intervals between the activity periods 410. FIG. 4B shows that power consumption of the device 310, as measured by the power management circuit 320, remains high during some active periods (e.g., 410-3) for a longer than normal (e.g., 5 seconds) time duration. This can be attributed to a possible attack (e.g., SDA) by an attacker.

Figure 5:
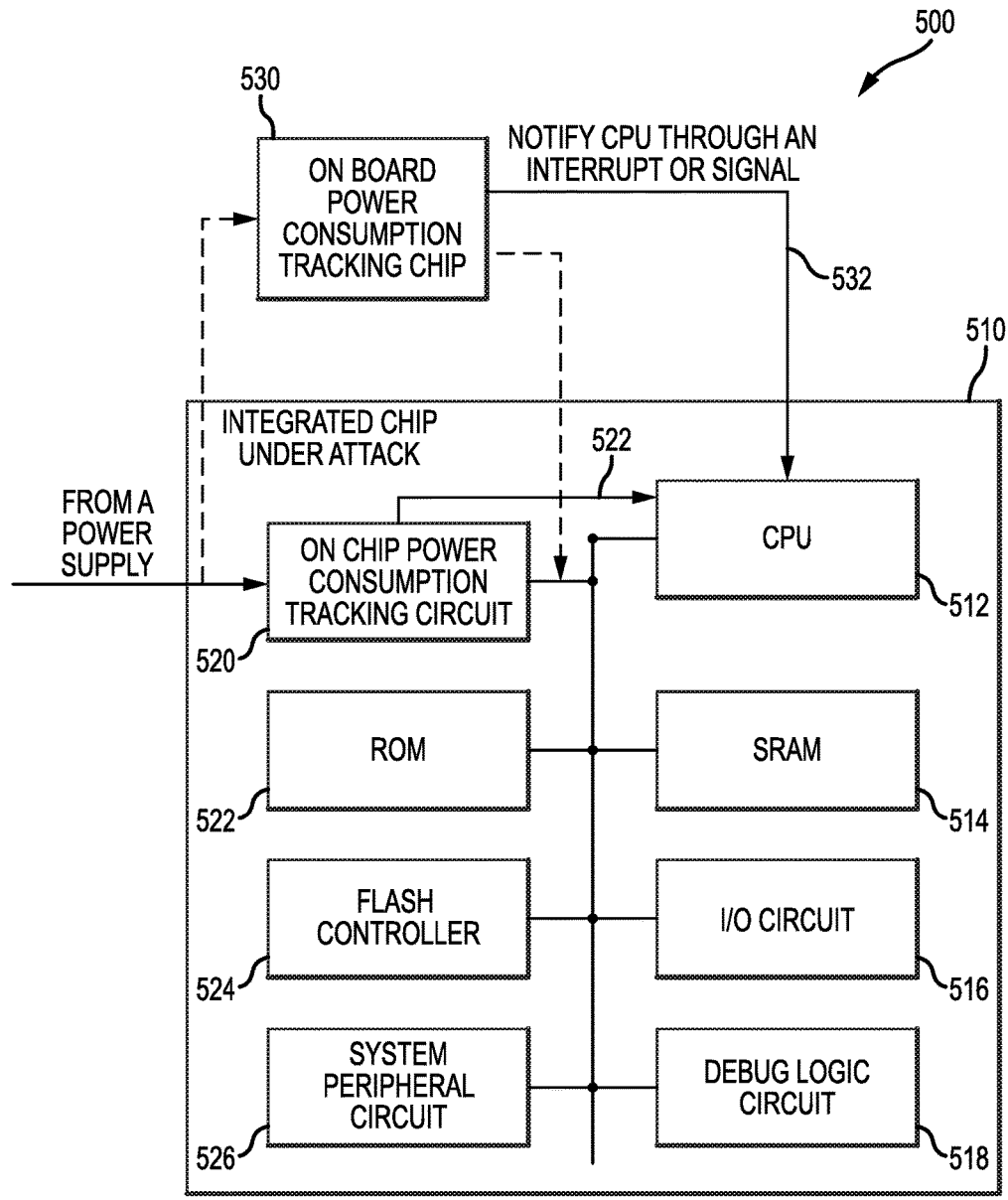
FIG. 5 illustrates an example of a system for SDA detection according to aspects of the subject technology.

FIG. 5 illustrates an example of a system 500 for SDA detection according to aspects of the subject technology. The system 500 is an example implementation of the system 300 of FIG. 3. In some implementations, the system 500 includes a circuit board including a chip 510 and an on-board power consumption tracking chip 530. The chip 510 includes a central processing unit (CPU) 512, a memory 514 (e.g., a static random-access memory (SRAM)), an input/output (I/O) circuit 516 (e.g., a universal asynchronous receiver/transmitter (UART), a serial peripheral interface (SPI), or other I/O circuits), a debug logic circuit 518, an on-chip power consumption tracking circuit 520, a read only memory (ROM) 522, a flash controller 524, and a system peripheral circuit 526 (e.g., a direct memory access (DMA), timers, and/or other peripheral circuits). The CPU 512, the SRAM 514, the I/O circuit 516, the debug logic circuit 518, the ROM 522, the flash controller 524, and the system peripheral circuit 526 include known logic and/or other circuitries to perform their corresponding functionalities.

The chip 510 and/or the on-board power consumption tracking chip 530 can receive power from an external power supply. The on-chip power consumption tracking circuit 520 and/or the on-board power consumption tracking chip 530 can track current drawn by the chip 510, a particular circuit (e.g., CPU 512) of the chip 510 or the circuit board 500 and send interrupts signals 522 or 532, respectively, to the CPU 512, upon detecting that the measured drawn current is higher than a pre-determined value (e.g., stored in memory 514 or ROM 522). The CPU 512 then triggers an SDA alert in response to the interrupt signal. As an example, for a BPD that consumes 15 μA during a sleep state and 40 mA during an active state, using values of 120 seconds and 20 milliseconds (ms), respectively, for the sleep and wake up intervals, gives:

$$P_{Duty\_Cycle}=P_{Sleep}+P_{Active}$$

$$P_{Sleep}=15\ \mu A*3.3V*120/3600=1.65\ \mu Watt\text{-}hour\ (0.00165\ mWatt\text{-}hour)$$

$$P_{Active}=120\ mA*3.3V*20*1000/3600=2200\ mWatt\text{-}hour$$

$$P_{Duty\_Cycle}=0.00165+2200=2200.00165\ mWatt\text{-}hour$$

Where, $P_{Duty\_Cycle}$, $P_{Sleep}$, and $P_{Active}$ are power consumptions values associated with the whole duty cycle, a sleep period, and a wake-up (active) period, respectively. For this example scenario, the on-chip power consumption tracking circuit 520 and/or the on-board power consumption tracking chip 530 can be configured to send interrupt signals 522 or 532, respectively, to the CPU 512, upon detecting that the $P_{Duty\_Cycle}$ crosses beyond 5500 mWatt-hour.

FIG. 6 illustrates an example system context table 600 of a remotely deployed surveillance device according to aspects of the subject technology. The tracker circuit 330 of FIG. 3, as described above, can keep track of incoming request signals to the device 310 of FIG. 3 and previous request-response sequence. This information can be used by device 310 to detect request signals that are causing attacks. The operating and/or environment conditions such as time and date, temperature, ambient light, and/or other operating conditions can be used to identify malicious request signals coming from a rogue host device (e.g., 104, 106, or 108 of FIG. 1). For example, a remotely deployed camera is intended to connect with its host every 4 hours. Requests for data received by the remotely deployed camera more frequently than once every 4 hours can be treated as suspicious requests. A system context can be built using the DUA's operating environment as shown in the example table 600. The system context table 600 shows variations of a number of operating conditions including, temperature, previous request time, communication interface involved, power consumption during the last 15 minutes, peripheral device used, and input classification for multiple subsequent request signals received by the camera. The first five request signals are received by the Wi-Fi interface and are classified as benign, while the last two request signals are received through a low-energy Bluetooth (BLE) interface and are identified as being malignant request signals. The malignant requests are seen to be received at 1 minute intervals rather than the expected 4 hours intervals. The incoming requests are classified as malignant based on all device context features including time, temperature, communication interface, power consumption during the last 15 minutes, and previous request times. The classification of the requests is based on a classification algorithm described below.

Figure 7:
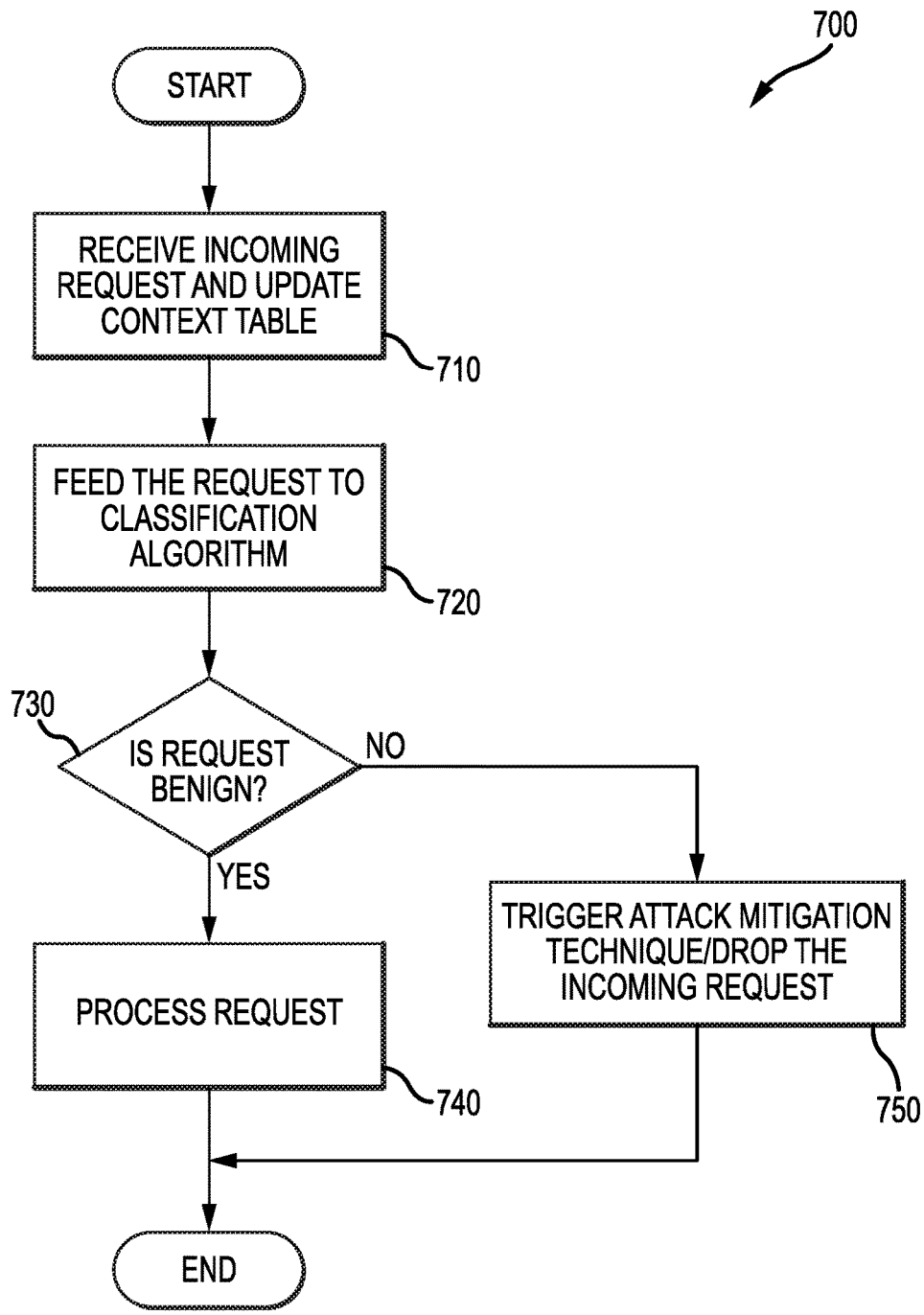
FIG. 7 illustrates an example method for SDA detection based on a classification algorithm according to aspects of the subject technology.

FIG. 7 illustrates an example method 700 for SDA detection based on a classification algorithm according to aspects of the subject technology. The method 700 starts at operation block 710, where an incoming request signal is received at one or more interfaces (e.g., a Wi-Fi, BLE, and/or other interfaces) of a DUA, for example, the device 310 FIG. 3 or the system 500 of FIG. 5. The timer 340 of FIG. 3 can measure arrival times of the received request signals. In some aspects, the CPU 512 of FIG. 5, at operation block 720, feeds the request signal to the classification algorithm stored in memory (e.g., the ROM 522 or SRAM 514 of FIG. 5). The classification algorithm, at operation block 730, decides whether the request is a benign or a malignant request. In case the request is a benign request, at operation block 740, the CPU 512 processes the request and the method ends. Otherwise, at operation block 750, an attack mitigation process is triggered and/or the incoming request is dropped. The method 700 is repeated for each incoming requests.

In some aspects, the classification algorithm uses recorded information such as system context information as shown in the system context table 600 to classify the incoming request. As indicated in the system context table incoming requests are captured based on time, temperature, previous incoming request time, request interface, and power consumption in the last 15 minutes. These features together constitute the system context. A supervised machine learning algorithm (e.g., a support vector machine) can be used for classifying the incoming input request as benign or malignant.

Figure 8:
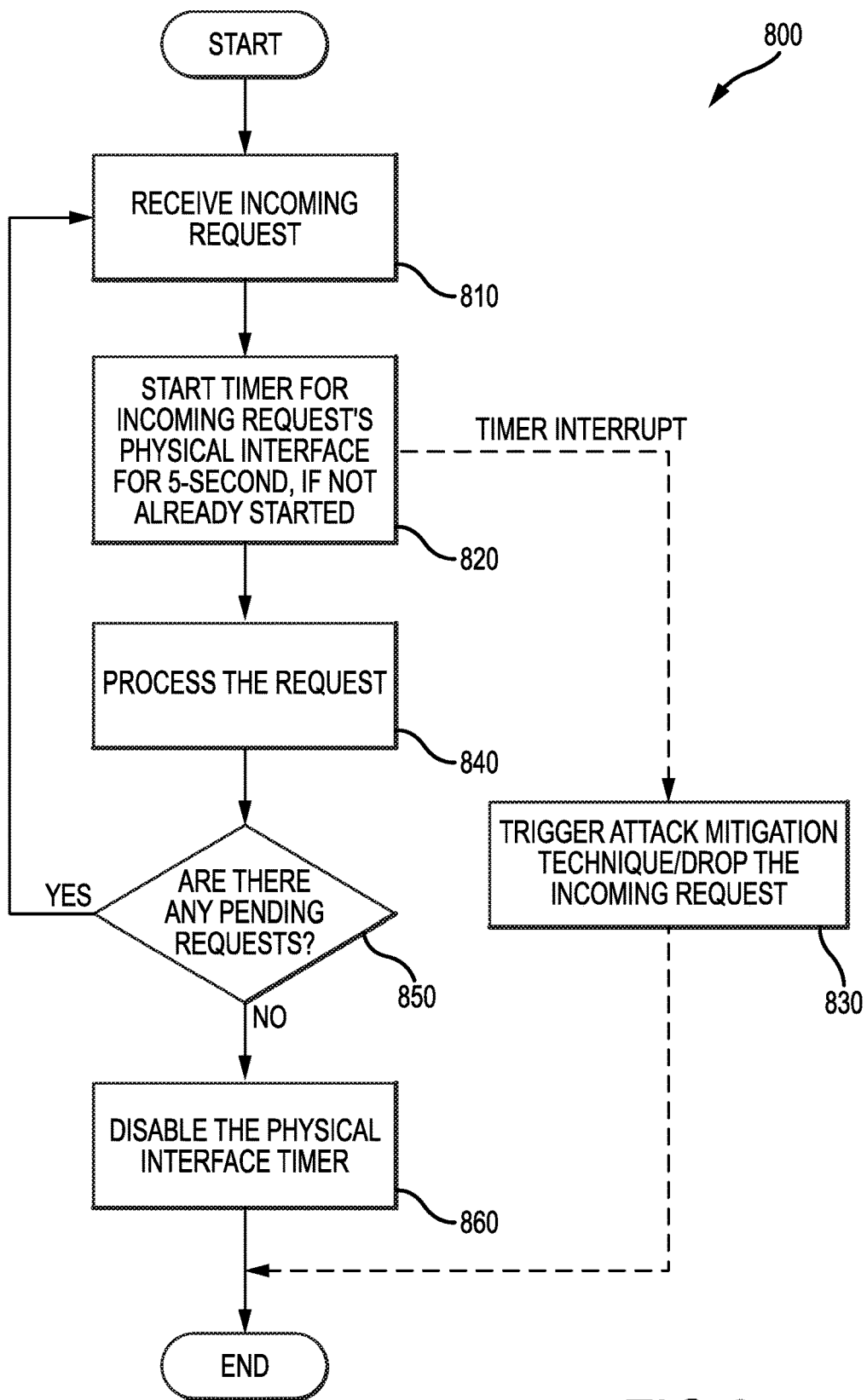
FIG. 8 illustrates an example method for SDA detection by associating a timer to a physical interface according to aspects of the subject technology.

FIG. 8 illustrates an example method 800 for SDA detection by associating a timer to a physical interface according to aspects of the subject technology. The method 800 starts at operation block 810, where an incoming request signal is received by at one or more interfaces (e.g., a Wi-Fi, BLE, and/or other interfaces) of a DUA, for example, the device 310 FIG. 3 or the system 500 of FIG. 5. At operation block 820, a timer (e.g., timer 340 of FIG. 3) is started to measure the activity duration of the physical interface receiving a request signal from other computers or devices. If the measured activity duration is higher than a pre-determined number (e.g., 5 seconds), at operation block 830, a timer interrupt is sent to the CPU 512 of FIG. 5 to trigger an attack alert and a SDA mitigation process and/or drop the request. Otherwise, at operation block 840, the request signal is processed and, at decision block 850, it is checked to see if there are any pending request signals. In case there are pending request signals, control is passed to the operation block 810. Otherwise, if no request signals are pending, at operation block 860, the timer is disabled and the method is terminated.

For example, the device 310 is a pacemaker device with BLE support that keeps updating the heart beat and device statistics with patient's mobile phone. When the patient is in a public area (e.g., a gym, a restaurant, a movie theatre, an office, a shopping mall, or another public area) it's possible that an attacker can keep requesting collected data more frequently to drain the battery of pacemaker device faster without the knowledge of patient. At this time, an attack mitigation process is enforced by performing a hard time out for device's active state duration to ensure containing the battery usage.

Figure 9A:
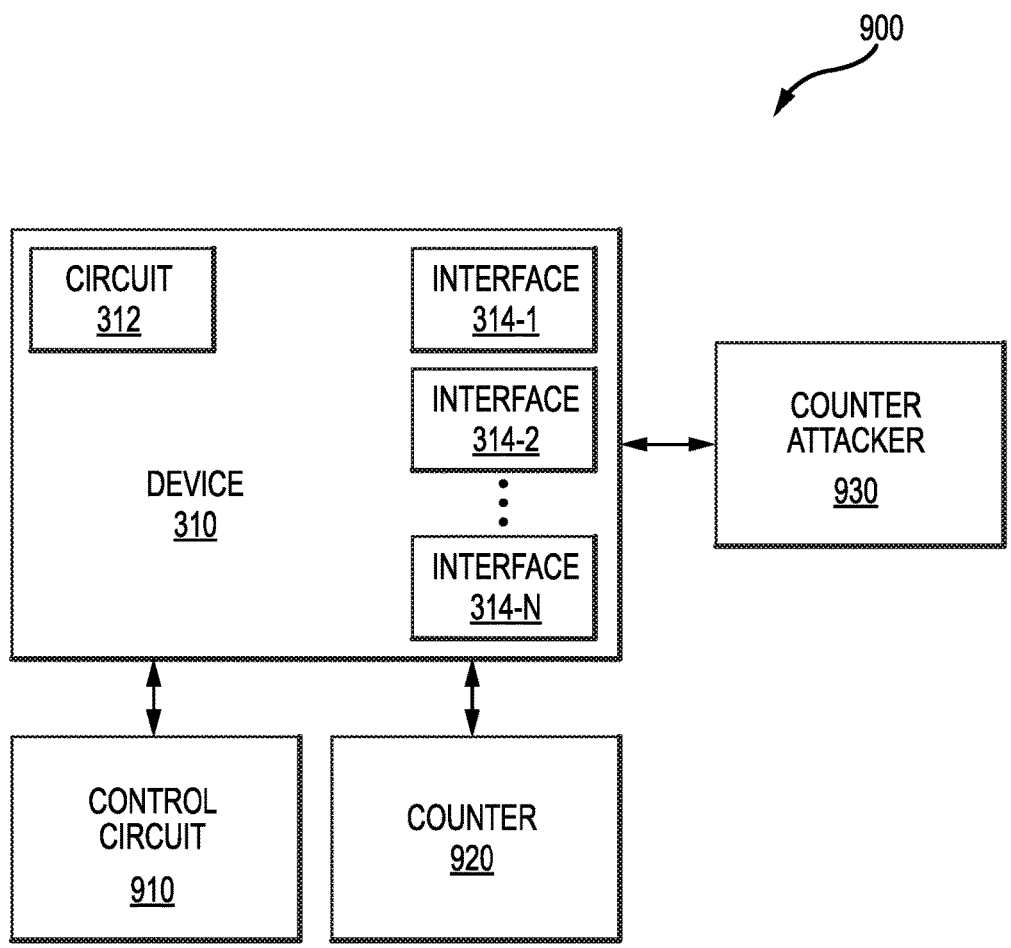
FIGS. 9A-9B illustrate an example of a system for mitigation of a SDA and a corresponding flow chart according to aspects of the subject technology.
Figure 9B:
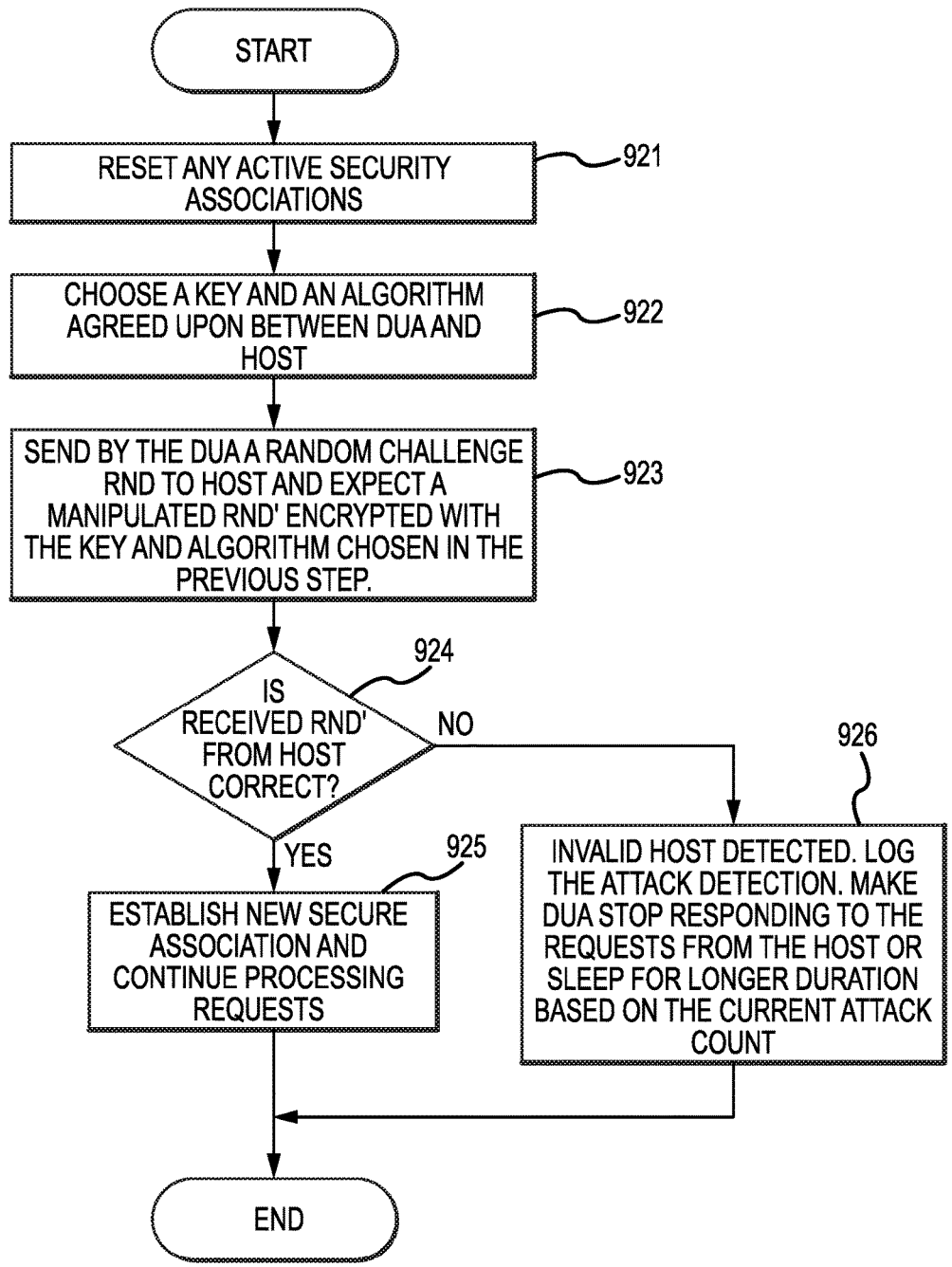

FIGS. 9A-9B illustrate an example of a system 900A for mitigation of a SDA and a corresponding flow chart 900B according to aspects of the subject technology. The system 900 includes the device 310 (e.g., a DUA), a control circuit 910, a counter 920, and a counter attack circuit 930. In one or more implementations, the device 310 includes the same circuits and interfaces as discussed above with respect to FIG. 3. In one or more aspects, mitigation of the SDA on the device 310 can be performed by a number of techniques. For example, the counter 920 count request signals received by the device 310 over one of the physical interfaces 314 (e.g., 312-1) from another device and a security action can be taken after serving a pre-determined number (e.g., 10) of request signals from the other device once an SDA is detected as explained above.

Examples of the security action include posing additional security challenges to the other device by the counter attack circuit 930, or terminating the connection with the other device by the control circuit 910 if an expected reply is not received from the other device within pre-determined time duration (e.g., 1 second). For example, the counter attack circuit 930 can pose the security challenges by sending a request message to the other device asking the other device to perform a specific action or send a response. The request message can use encryption and/or authentication.

For example, a BPD (e.g., 125 of FIG. 1) deployed in the field, for instance, to monitor oil transmission can get a request to transmit monitoring data from a compromised node (e.g., 134 of FIG. 1) from the same network (e.g., 120 of FIG. 1) repeatedly. Upon detecting that power consumption has reached the preset threshold limits, the BPD 125 can pose one or more additional challenges before further processing the request. For instance, the counter attack circuit 930 of the BPD 125 can send a response by appending a challenge message and expect a manipulated challenge message in the next request from the node 134. Failing to receive the expected message can be seen as an illegitimate request from the node 134 and the corresponding connection can be terminated.

In some aspects, the control circuit 910 can enforce a hard time-out for a wake up period of the device 310 by configuring the device 310 to enter a sleep state a few seconds after entering an active state. In some implementations, enforcement of the hard time-out for the wake up period of the device 310 can be performed by configuring the device 310 to enter a sleep state a few seconds after entering an active state.

In one or more aspects, the control circuit 910 can enforce fair-use policies to discard a potential request signal from a potential attacker. The fair-use policies involve, for example, breaching one or more operating conditions. Examples of fair use policies include: 1) a response to a request signal from the device 310 is accepted only once in a 5-minute time slot; 2) during an hour time period, only five request signals are processed by the device 310 in normal usage mode; 3) only one physical interface can be active at any given point of time; 4) the device 310 is supposed to be operated only between 0° C. and 50° C. For example, a real-time weather monitoring device deployed in a field can service incoming service request signals at every 30 or 60 minutes intervals. Queries coming more frequently (e.g., every 10 seconds) indicates that the incoming request signals are breaching the device's fair use policy, signaling a probable SDA attack.

In some implementations, the control device 910 mitigates an SDA by seeking action from a supervisory device such as a cluster-head node (e.g., 126 of FIG. 1), a sink node (e.g., 122 of FIG. 1), or an Internet observer (e.g., 126 of FIG. 1). A wireless sensor network (e.g., 120 of FIG. 1) can be organized into clusters and each cluster be assigned with a cluster head node. The cluster head node or a sink node within the network or the observer over the Internet can take decision based on the current context such as the health of the other devices in the field, battery level of the DUA to continue processing the request signals or trigger a mitigation action.

In one or more aspects, the control device 910 can switch communications of the device 310 over to a different physical interface other than a currently in-use interface. In one or more implementations, the control circuit 910 can shut down a current physical interface that is attacked by the attacker.

FIG. 9B shows an operational flow chart 900B of the counter attack circuit 920. At operation block 921, any active security associations are reset. At operation block 922, a key and an algorithm agreed upon between the DUA and the host are chosen. At operation block 923, the DUA sends a random challenge (RND) to host and expects a manipulated version (RND') encrypted with the key and the algorithm chosen in the previous operation block. At control block 924 it is determined whether the manipulated version (RND') is received from the host is correct. If the answer is yes, the control is passed to an operation block 925. Otherwise, if the answer is no, control is passed to an operation block 926. At operation block 926, it is determined that the host is invalid and an attack detection incidence is logged. At this point, the DUA can stop responding to the requests from the host or sleep for longer duration based on the current attack count (e.g., attack no. 1, sleep for 5 minutes; attack no. 2, sleep for 30 minutes; attack no. 3, sleep for 2 hours and so on). At operation block 925, a new secure association is established and processing the requests is continued.

Figure 10:
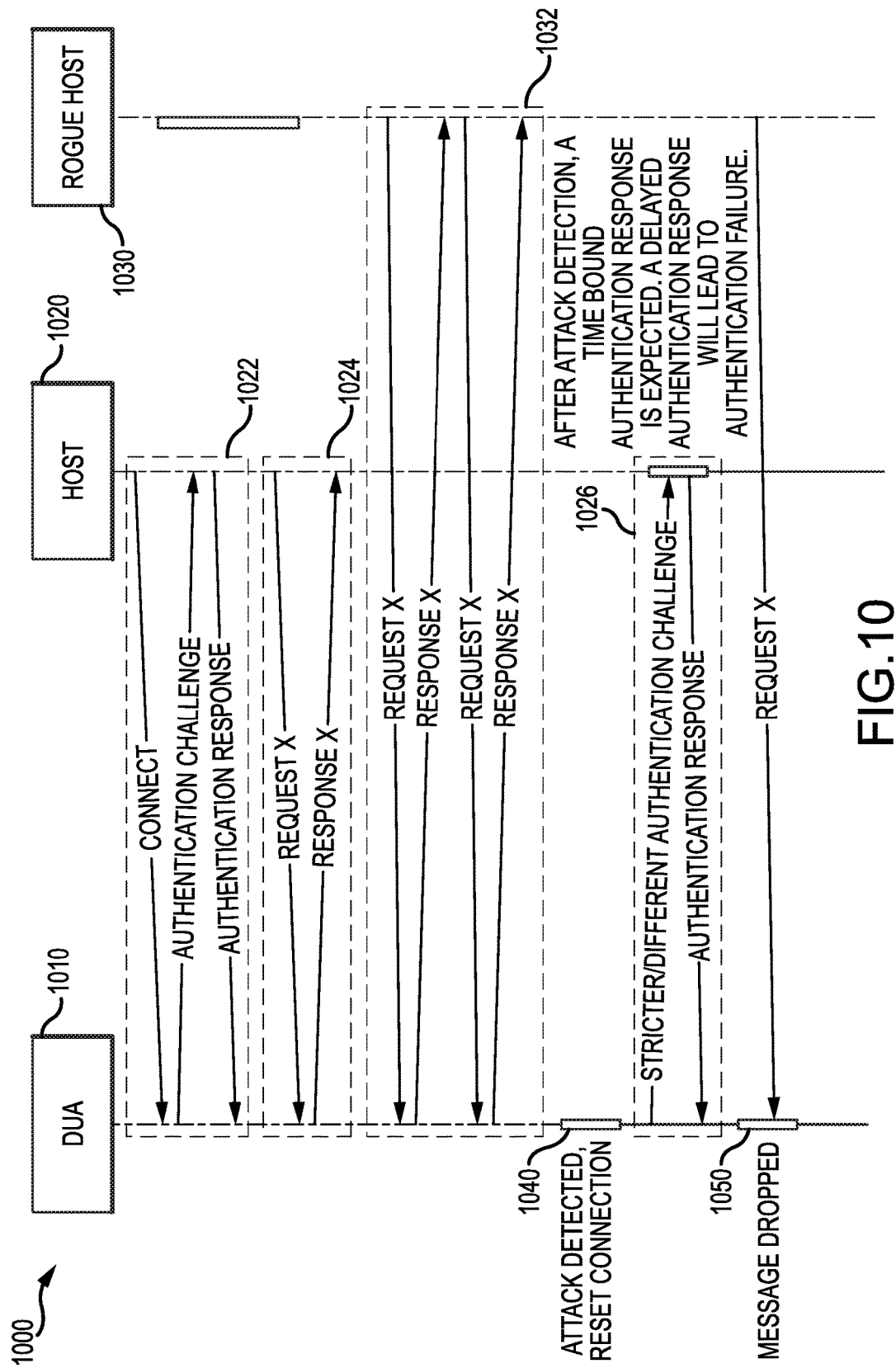
FIG. 10 is a timing diagram illustrating an example method for attack mitigation according to aspects of the subject technology.

FIG. 10 is a timing diagram illustrating an example method 1000 for attack mitigation according to aspects of the subject technology. The method 1000 starts with the authentication block 1022, in which a host 1020 engages in an authentication process with a DUA 1010. At communication block 1024, a request signal is received by the DUA 1010 from the host 1020 and a response is issued by the DUA 1010. During communication block 1032, the DUA 1010 receives a first and a second request signal from a host 1030 (e.g., a rouge host) and responds to the request signals. The DUA 1010 detects a SDA at 1040 and resets the current secure connection and re-authenticates the host to ensure that any message with previous security association is not processed (1026). The DUA 1010 expects a tighter time bound response from the host after detection of the SDA. If the host fails to respond within an expected time period (e.g., 5 second), the authentication process leads to failure. In some aspects, the DUA 1010 drops any message requests from the host 1030 as a security measure (1050).

Figure 11:
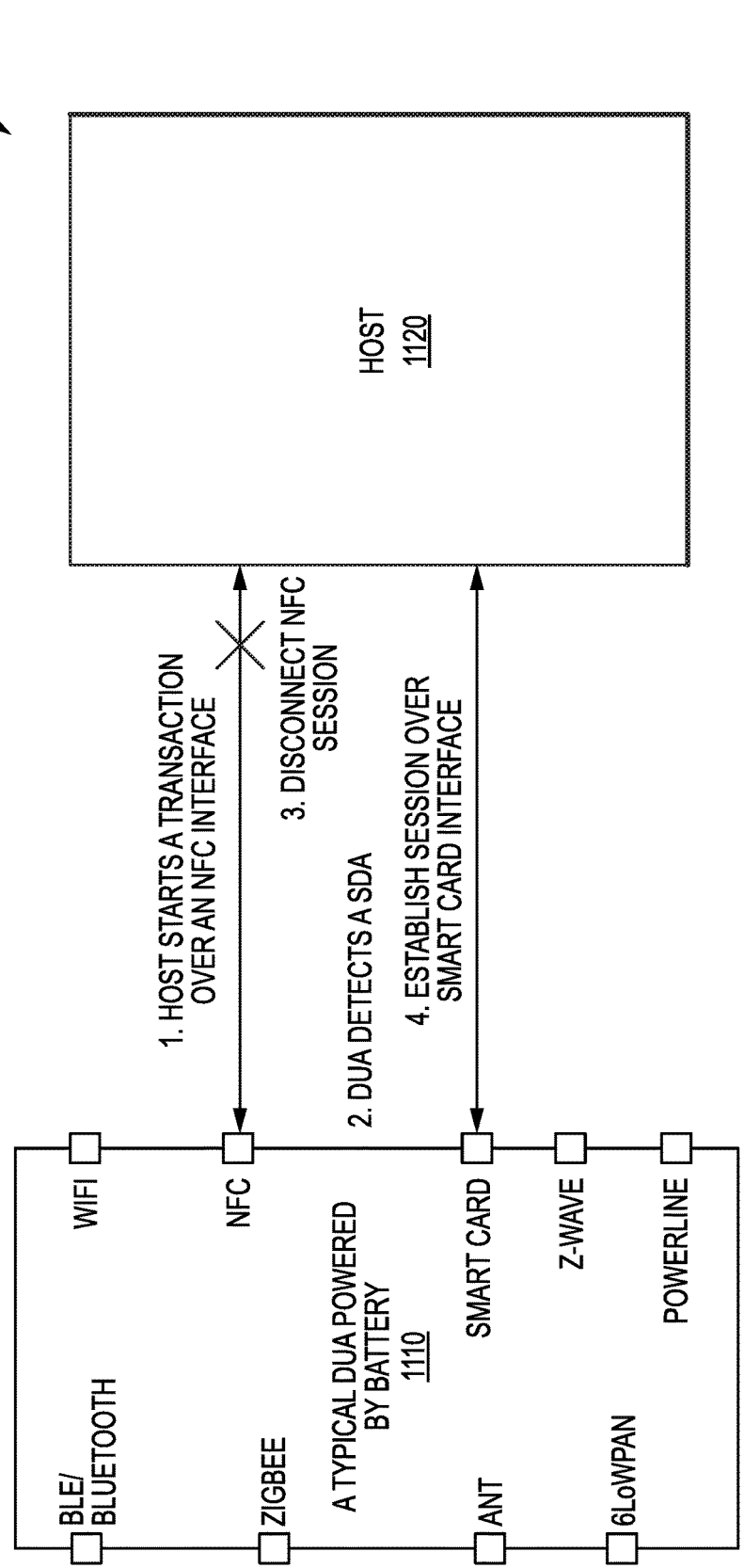
FIG. 11 illustrates an example of a system for mitigation of a SDA according to aspects of the subject technology.

FIG. 11 illustrates an example of a system 1100 for mitigation of a SDA according to aspects of the subject technology. The system 1100 includes a BPD 1100 that is under attack by a host 1020. The BPD 1100 includes a number of physical interfaces such as BLE/Bluetooth, Wi-Fi, ZigBee, NFC, ANT, Smart Cord, X-wave, Powerline, and 6LoWPAN interfaces. The host 1120 starts a transaction over one of the physical interfaces (e.g., the NFC interface) with the BPD 1100. The BPD 1100 detects a SDA, and in response disconnects the connection with the host 1120 over the NFC interface. The BPD 1100, as an attack mitigation measure, starts communicating over another interface (e.g., the Smart Card interface). This pushes the attacker to create an attack on the other physical interface or wait for next opportunity to attack the same physical interface. Even in the case of enforcing encryption and authentication policies, an attacker can keep sending incorrect data and the device has to perform power consuming crypto operations to know that the received message is an incorrect one. In this case shutting down the physical interface is a more appropriate mitigation action.

For example, a remotely deployed mobile point of sale (MPoS) device powered by coin cell battery can use NFC technology to facilitate payment transactions over the contactless interface can periodically check for presence of NFC card (e.g., proximity integrated circuit card (PICC)) and wake up on card detection. An attacker can place an invalid card to keep the MPoS device in an active state for longer duration and forcing it to deprive itself from sleep. The MPoS device, upon detecting rapid power consumption rise can switch over to another interface, e.g., a contact smart card interface, as many banking cards in the field support both contact and contactless modes.

Figure 12:
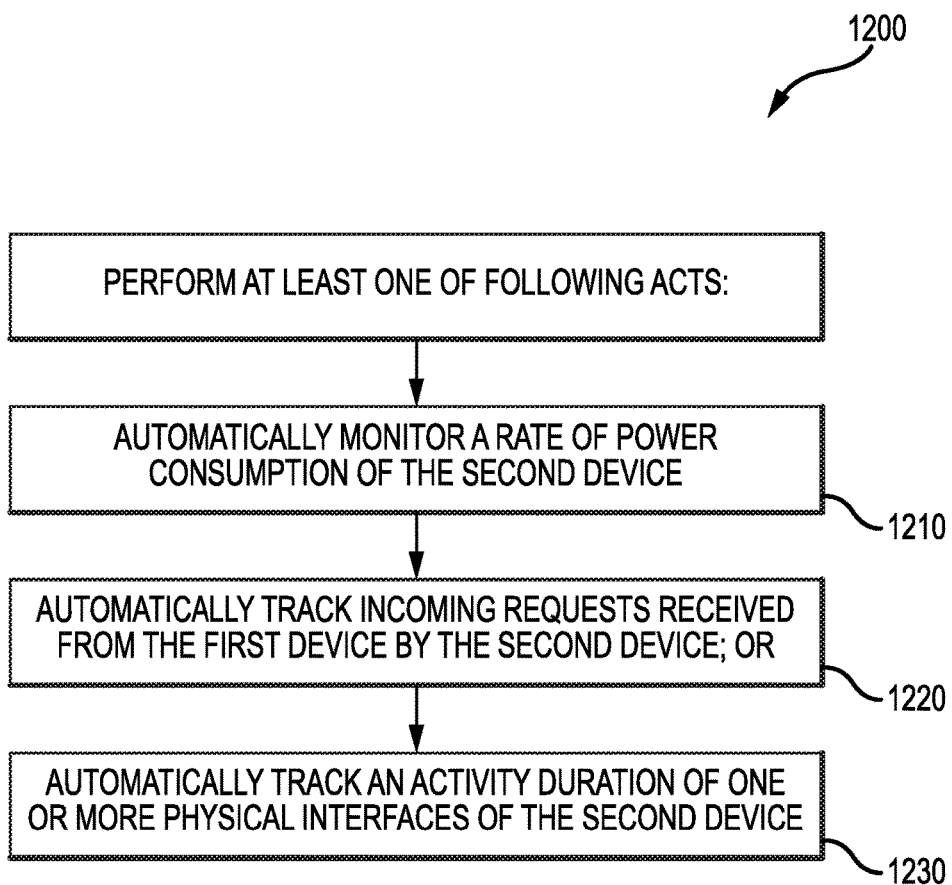
FIG. 12 is a flow diagram illustrating an example of a method for detection of a SDA according to aspects of the subject technology.

FIG. 12 is a flow diagram illustrating an example of a method 1200 for detection of a SDA according to aspects of the subject technology. In one or more implementations, the method 1200 includes automatically monitoring (e.g., by 320 of FIG. 3) the rate of power consumption of the second device (e.g., 125 of FIG. 1 or 310 of FIG. 3) (1210), automatically tracking (e.g., by 330 of FIG. 3) incoming request signals received from the first device (e.g., 104 of FIG. 1) by the second device (1220), or automatically tracking (e.g., by 340 of FIG. 3) the activity duration of one or more physical interfaces (e.g., Wi-Fi, Bluetooth, or Zig-Bee) of the second device (1230).

Figure 13:
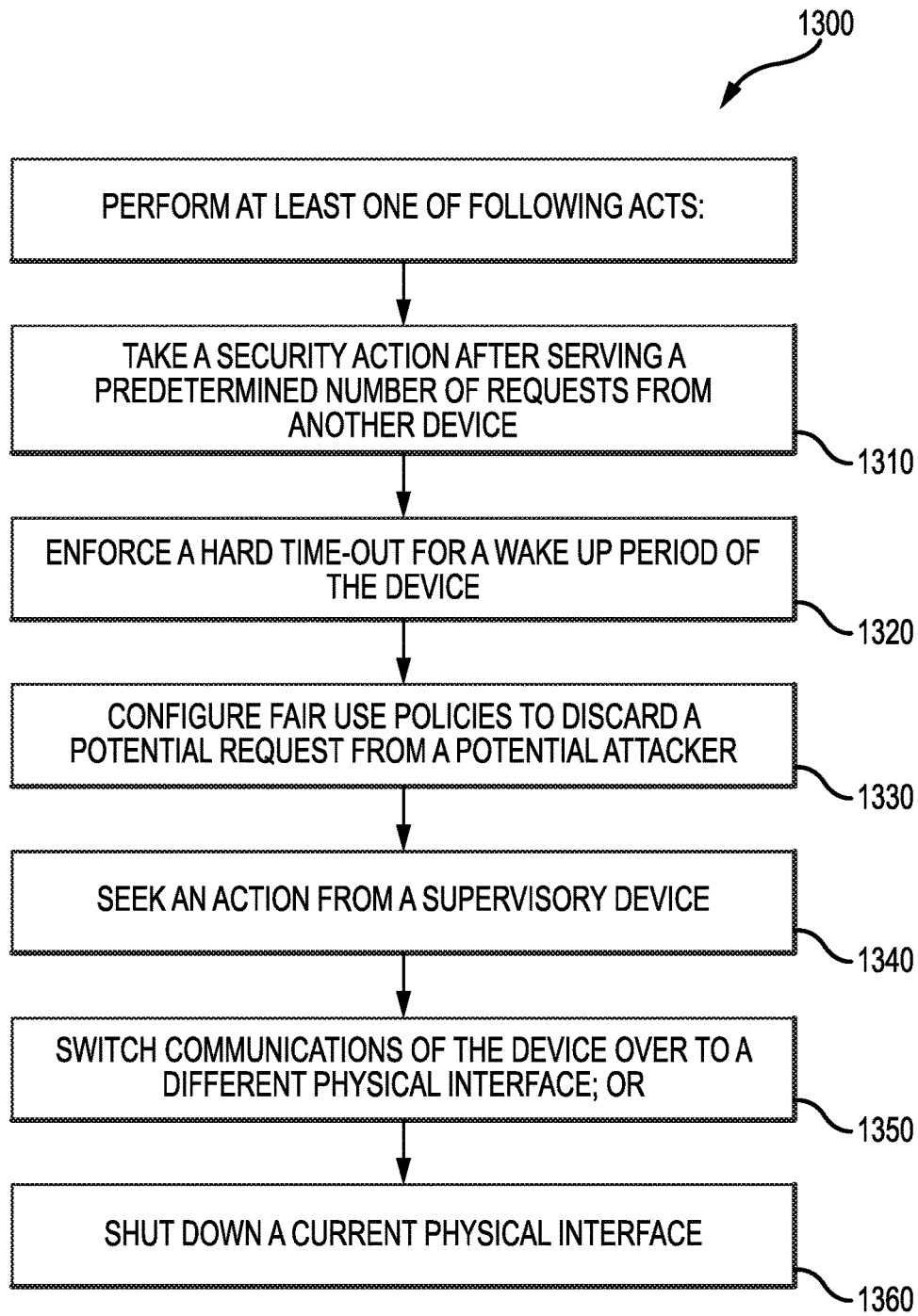
FIG. 13 is a flow diagram illustrating an example of a method for mitigation of a SDA according to aspects of the subject technology.

FIG. 13 is a flow diagram illustrating an example of a method 1300 for mitigation of a SDA according to aspects of the subject technology. In one or more implementations, the method 1300 can be performed by a number of techniques. For example, a security action can be taken (e.g., by 930 of FIG. 9) after serving a pre-determined number of request signals (e.g., counted by 920 of FIG. 9) from another device (1310); enforcing (e.g., by 910 of FIG. 9) a hard time-out for the wake up period of the device (e.g., by 310 of FIG. 9) (1320); configuring (e.g., by 910 of FIG. 9) fair use policies to discard the potential request signal from the potential attacker (e.g., 104 of FIG. 1) (1330); seeking an action from a supervisory device (e.g., 102, 122, or 126 of FIG. 1) (1340); switching (e.g., by 910 of FIG. 9) communications of the device to a different physical interface (e.g., 314-2 of FIG. 9) (1350); or shutting down the current physical interface (e.g., 314-1 of FIG. 9) (1360).

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry.

Some implementations can include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Some implementations can be performed by a microprocessor or multi-core processors that execute software. Some implementations can be performed by one or more integrated circuits, such as application specific integrated circuits (ASICs) or field programmable gate arrays (FPGAs). In some implementations, such integrated circuits can execute instructions that are stored on the circuit itself.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for detection of a sleep deprivation attack (SDA) by a first device on a second device, the method comprising:
   automatically monitoring, by a power management circuit of the second device, a current drawn by the second device or a circuit of the second device, wherein the power management circuit comprises an on-chip logic circuit or an on-board additional power management chip;
   automatically tracking, by a tracker circuit of the second device, incoming request signals received from the first device by one or more physical interfaces of the second device; and
   using a machine learning based classification algorithm to detect the SDA based on an operating condition including at least a time of the day and an ambient temperature;
   automatically tracking, by a timer of the second device, an activity duration of the one or more physical interfaces of the second device by associating an activity duration longer than a pre-determined length of time with the SDA.

2. The method of claim 1, wherein the method comprises automatically monitoring, by the power management circuit of the second device, the current drawn by the second device or the circuit of the second device, and the power management circuit comprises an on-chip logic circuit or an on-board additional power management chip.

3. The method of claim 1, wherein using the machine learning based classification algorithm to further detect the SDA based on other operating conditions including ambient light.

4. The method of claim 1, wherein the method comprises automatically tracking, by a timer of the second device, the activity duration of the one or more physical interfaces of the second device by associating an activity duration longer than a pre-determined length of time with the SDA, and wherein the one or more physical interfaces comprise Wi-Fi, Bluetooth, near field communication (NFC), actor-network theory (ANT), Powerline, IPv6 over Low power wireless personal area networks (6Low PAN), and ZigBee interfaces.

5. A method comprising:
   detecting a sleep deprivation attack (SDA) by a first device on a second device based on a monitored current of the second device;
   configuring, by a control circuit of the second device, fair use policies to discard a potential request signal from a potential attacker; and
   seeking an action from a supervisory device; or
   switching communications of the second device over to a different physical interface.

6. The method of claim 5, further comprising taking a security action, by a counter attack circuit of the second device, after serving a pre-determined number of request signals from the first device, and wherein taking the security action is performed, by a counter attack circuit of the second device, after serving the pre-determined number of request signals from the first device and posing additional security challenges to the first device.

7. The method of claim 5, wherein the method comprises enforcing, by a control circuit of the second device, the hard time-out for the wake up period of the second device by configuring the second device to enter a sleep state a few seconds after entering an active state.

8. The method of claim 5, wherein the fair use policies involve breaching one or more operating conditions.

9. The method of claim 5, wherein the method comprises seeking the action from the supervisory device, wherein the supervisory device comprises one of a cluster-head node, a sink node, or an Internet observer.

10. The method of claim 5, further comprising:
    shutting down a current physical interface of the second device;
    switching the communications of the second device over to the different physical interface other than a currently in-use interface; and shutting down the current physical interface of the second device once the SDA is detected.

11. A system for detection of a sleep deprivation attack (SDA), the system comprising:
   a device to be protected from the SDA;
   a power management circuit configured to track a rate of power consumption of the device by monitoring a current drawn by the device, wherein the power management circuit comprises an on-chip logic circuit or an on-board additional power management chip;
   a tracker circuit configured to track incoming request signals received by the device and to use a machine learning based classification algorithm to detect the SDA based on an operating condition including at least a time of the day and an ambient temperature; and
   a timer configured to track an activity duration of one or more physical interfaces of the device by associating an activity duration longer than a pre-determined length of time with the SDA.

12. The system of claim 11, wherein the power management circuit is configured to monitor a current drawn by the device or a circuit of the device, wherein the power management circuit is implemented as an on-chip logic circuit or an on-board additional power management chip.

13. The system of claim 11, wherein the tracker circuit utilizes a machine learning based classification algorithm configured to detect the SDA based on other operating conditions including ambient light.

14. The system of claim 11, wherein the timer is configured to measure the activity duration of the one or more physical interfaces of the device, and the system further comprises a comparator configured to compare the measured activity duration with a pre-determined time duration to detect the SDA, and wherein the one or more physical interfaces comprise Wi-Fi, Bluetooth, near field communication (NFC), actor-network theory (ANT), Powerline, IPv6 over Low power wireless personal area networks (6Low PAN), and ZigBee interfaces.

15. A system for mitigation of a sleep deprivation attack (SDA), the system comprising:
   a device to be protected from the SDA;
   a power management circuit configured to monitor a current drawn by the device or a circuit of the device, wherein the power management circuit comprises an on-chip logic circuit or an on-board additional power management chip;
   a counter attack circuit configured to pose one or more security challenges to the another device once based on the monitored current; and
   a control circuit configured to terminate connection with the another device when an expected reply is not received from the another device within a pre-determined time duration,
   wherein:
   posing the one or more security challenges comprises sending a request message to the another device, and the expected reply comprises a reply based on the request message.

16. The system of claim 15, wherein the control circuit is further configured to enforce a hard time-out for a wake up period of the device by configuring the device to enter a sleep state a few seconds after entering an active state.

17. The system of claim 15, wherein the control circuit is further configured to enforce fair-use policies to discard a potential request signal from a potential attacker, wherein the fair-use policies involve breaching one or more operating conditions.

18. The system of claim 15, wherein the control circuit is further configured to seek action from a supervisory device, wherein the supervisory device comprises one of a cluster-head node, a sink node, or an Internet observer.

19. The system of claim 15, wherein the control circuit is further configured to switch communications of the device over to a different physical interface other than a currently in-use interface.

20. The system of claim 15, wherein the control circuit is further configured to shut down a current physical interface once the SDA is detected.

* * * * *